(12) United States Patent
Sigler et al.

(10) Patent No.: US 10,981,243 B2
(45) Date of Patent: Apr. 20, 2021

(54) MULTI-STEP DIRECT WELDING OF AN ALUMINUM-BASED WORKPIECE TO A STEEL WORKPIECE

(71) Applicant: GM GLOBAL TECHNOLOGY OPERATIONS LLC, Detroit, MI (US)

(72) Inventors: David R. Sigler, Shelby Township, MI (US); Blair E. Carlson, Ann Arbor, MI (US); Yelena Myasnikova, West Bloomfield, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 358 days.

(21) Appl. No.: 15/976,163

(22) Filed: May 10, 2018

(65) Prior Publication Data
US 2018/0257166 A1 Sep. 13, 2018

Related U.S. Application Data

(63) Continuation of application No. 14/464,476, filed on Aug. 20, 2014, now Pat. No. 9,999,938.

(60) Provisional application No. 61/869,281, filed on Aug. 23, 2013.

(51) Int. Cl.
*B23K 11/20* (2006.01)
*B23K 11/11* (2006.01)
*B23K 103/20* (2006.01)

(52) U.S. Cl.
CPC ............. *B23K 11/20* (2013.01); *B23K 11/115* (2013.01); *B23K 2103/20* (2018.08)

(58) Field of Classification Search
CPC .... B23K 11/115; B23K 11/20; B23K 2103/20
USPC ....................................... 219/91.22
See application file for complete search history.

(56) References Cited

U.S. PATENT DOCUMENTS

| | | |
|---|---|---|
| 5,302,797 A | 4/1994 | Yasuyama et al. |
| 5,783,794 A | 7/1998 | Oikawa et al. |
| 6,037,559 A | 3/2000 | Okabe et al. |
| 7,850,059 B2 | 12/2010 | Kobayashi et al. |
| 7,935,908 B2 | 5/2011 | Nakagawa et al. |
| 7,951,465 B2 | 5/2011 | Urushihara et al. |
| 7,984,840 B2 | 7/2011 | Kobayashi et al. |
| 8,020,749 B2 | 9/2011 | Kobayashi et al. |
| 8,058,584 B2 | 11/2011 | Miyamoto et al. |

(Continued)

FOREIGN PATENT DOCUMENTS

| | | |
|---|---|---|
| CN | 1946506 | 4/2007 |
| CN | 102059439 | 5/2011 |

(Continued)

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.

(Continued)

*Primary Examiner* — Dana Ross
*Assistant Examiner* — Joseph W Iskra

(57) ABSTRACT

A workpiece stack-up that includes at least a steel workpiece and an aluminum-based workpiece can be resistance spot welded by employing a multi-stage spot welding method in which the passage of electrical current is controlled to perform multiple stages of weld joint development.

17 Claims, 6 Drawing Sheets

(56) References Cited

U.S. PATENT DOCUMENTS

| | | |
|---|---|---|
| 8,487,206 B2 | 7/2013 | Urushihara et al. |
| 8,502,105 B2 | 8/2013 | Tanaka et al. |
| 9,676,065 B2 | 6/2017 | Sigler et al. |
| 2005/0218121 A1 | 10/2005 | Hayashi et al. |
| 2005/0247679 A1 | 11/2005 | Wang |
| 2007/0212565 A1 | 9/2007 | Urushihara et al. |
| 2009/0255908 A1 | 10/2009 | Sigler et al. |
| 2011/0097594 A1 | 4/2011 | Tanaka et al. |
| 2012/0021240 A1 | 1/2012 | Urushihara et al. |
| 2013/0189023 A1 | 7/2013 | Spinella |
| 2013/0263638 A1 | 10/2013 | Gugel et al. |
| 2014/0305912 A1 | 10/2014 | Taniguchi et al. |
| 2014/0360986 A1 | 12/2014 | Sigler et al. |
| 2015/0053654 A1 | 2/2015 | Sigler et al. |
| 2015/0053655 A1 | 2/2015 | Sigler et al. |
| 2015/0083693 A1 | 3/2015 | Schroth et al. |
| 2015/0096961 A1 | 4/2015 | Carlson et al. |
| 2015/0096962 A1 | 4/2015 | Sigler et al. |
| 2015/0231729 A1 | 8/2015 | Yang et al. |
| 2015/0231730 A1 | 8/2015 | Sigler et al. |
| 2015/0352658 A1 | 12/2015 | Yang et al. |
| 2015/0352659 A1 | 12/2015 | Sigler et al. |
| 2016/0016252 A1 | 1/2016 | Edwards, II |
| 2016/0158874 A1 | 6/2016 | Wang et al. |
| 2016/0279732 A1 | 9/2016 | Sigler et al. |
| 2016/0288242 A1 | 10/2016 | Sigler et al. |
| 2016/0346865 A1 | 12/2016 | Sigler et al. |
| 2017/0008118 A1 | 1/2017 | Yang et al. |
| 2017/0106466 A1 | 4/2017 | Sigler et al. |
| 2017/0157697 A1 | 6/2017 | Yang et al. |
| 2017/0225262 A1 | 8/2017 | Sigler et al. |
| 2017/0225263 A1 | 8/2017 | Sigler et al. |
| 2017/0232548 A1 | 8/2017 | Carlson et al. |
| 2017/0252853 A1 | 9/2017 | Wang et al. |
| 2017/0282303 A1 | 10/2017 | Wang et al. |
| 2017/0291246 A1 | 10/2017 | Sigler et al. |
| 2017/0291247 A1 | 10/2017 | Sigler et al. |
| 2017/0291248 A1 | 10/2017 | Sigler et al. |
| 2017/0297134 A1 | 10/2017 | Sigler et al. |
| 2017/0297135 A1 | 10/2017 | Sigler et al. |
| 2017/0297136 A1 | 10/2017 | Brown et al. |
| 2017/0297137 A1 | 10/2017 | Perry et al. |
| 2017/0297138 A1 | 10/2017 | Sigler et al. |
| 2017/0304925 A1 | 10/2017 | Sigler et al. |
| 2017/0304928 A1 | 10/2017 | Sigler et al. |
| 2017/0361392 A1 | 12/2017 | Sigler et al. |

FOREIGN PATENT DOCUMENTS

| | | |
|---|---|---|
| CN | 102114574 | 7/2011 |
| JP | 11342477 | 12/1999 |
| JP | 2011224578 | * 11/2011 |
| JP | 2013151017 | * 8/2013 |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

English translation of CN 102059439 to Mazda Motor (published May 18, 2011).

English translation JP 2011224578 to Kobe Steel (published Nov. 10, 2011).

English translation of JP2013151017 to Mazda Motor (published Aug. 8, 2013).

Haselhuhn et al., U.S. Appl. No. 15/807,219 entitled "Electrode Weld Face Design," filed Nov. 8, 2017.

Sigler et al., U.S. Appl. No. 15/907,996 entitled "Improving Mechanical Performance of Al-Steel Weld Joints by Limiting Steel Sheet Deformation," filed Feb. 28, 2018.

Sigler et al., U.S. Appl. No. 15/920,784 entitled "Resistance Spot Welding Workpiece Stack-Ups Having a Steel Workpiece and an Aluminum Workpiece with a Steel Plate," filed Mar. 14, 2018.

* cited by examiner

MULTI-STEP DIRECT WELDING OF AN ALUMINUM-BASED WORKPIECE TO A STEEL WORKPIECE

CROSS-REFERENCE TO RELATED APPLICATIONS

This application is a continuation of U.S. application Ser. No. 14/464,476, filed on Aug. 20, 2014 and published as U.S. Pub. No. 2015/0053655, which in turn claims the benefit of U.S. Provisional Application No. 61/869,281 filed on Aug. 23, 2013. The entire contents of each of the aforementioned applications are hereby incorporated by reference.

TECHNICAL FIELD

The technical field of this disclosure relates generally to resistance spot welding and, more particularly, to resistance spot welding a workpiece stack-up that includes an aluminum-based workpiece and a steel workpiece assembled in overlapping fashion relative to one another.

BACKGROUND

Resistance spot welding is a process used by a number of industries to join together two or more metal workpieces. The automotive industry, for example, often uses resistance spot welding to join together pre-fabricated metal workpieces during the manufacture of a vehicle door, hood, trunk lid, or lift gate, among others. A number of spot welds are typically formed along a peripheral edge of the metal workpieces or some other bonding region to ensure the part is structurally sound. While spot welding has typically been practiced to join together certain similarly-composed metal workpieces—such as steel-to-steel and aluminum alloy-to-aluminum alloy—the desire to incorporate lighter weight materials into a vehicle body structure has generated interest in joining steel workpieces to aluminum-based (aluminum or aluminum alloy) workpieces by resistance spot welding. In particular, the ability to resistance spot weld workpiece stack-ups containing different workpiece combinations (e.g., steel/steel, aluminum-based/steel, and aluminum-based/aluminum-based) with one piece of equipment would promote production flexibility and reduce manufacturing costs.

Resistance spot welding, in general, relies on the resistance to the flow of an electrical current through overlapping metal workpieces and across their faying interface to generate heat. To carry out such a welding process, a pair of opposed spot welding electrodes are typically clamped at diametrically aligned spots on opposite sides of the workpieces at a predetermined weld site. An electrical current is then passed through the metal workpieces from one electrode to the other. Resistance to the flow of this electrical current generates heat within the metal workpieces and at their faying interface. When the metal workpieces being spot welded together are a steel workpiece and an aluminum-based workpiece, the heat generated at the faying interface initiates a molten weld pool extending into the aluminum-based workpiece from the faying interface. This molten weld pool wets the adjacent surface of the steel workpiece and, upon cessation of the current flow, solidifies into a weld nugget that forms all or part of a weld joint.

In practice, however, spot welding a steel workpiece to an aluminum-based workpiece is challenging since a number of characteristics of those two metals can adversely affect the strength—most notably the peel strength—of the weld joint.

For one, the aluminum-based workpiece usually contains one or more refractory oxide layers on its surface. The oxide layer(s) are typically composed of aluminum oxides, although other oxide compounds may also be present. For example, in the case of magnesium-containing aluminum alloys, the oxide layer(s) also typically include magnesium oxides. The oxide layer(s) present on the aluminum-based workpiece are electrically insulating and mechanically tough. As a result of these physical properties, the oxide layer(s) have a tendency to remain intact at the faying interface where they can hinder the ability of the molten weld pool to wet the steel workpiece. Efforts have been made in the past to remove the oxide layer(s) from the aluminum-based workpiece prior to spot welding. Such removal practices can be unpractical, though, since the oxide layer(s) have the ability to self-heal or regenerate in the presence of oxygen, especially with the application of heat from spot welding operations.

The steel workpiece and the aluminum-based workpiece also possess different properties that tend to complicate the spot welding process. Specifically, steel has a relatively high melting point (~1500° C.) and relatively high electrical and thermal resistivities, while the aluminum-based material has a relatively low melting point (~600° C.) and relatively low electrical and thermal resistivities. As a result of these physical differences, most of the heat is generated in the steel workpiece during current flow. This heat imbalance sets up a temperature gradient between the steel workpiece (higher temperature) and the aluminum-based workpiece (lower temperature) that initiates rapid melting of the aluminum-based workpiece. The combination of the temperature gradient created during current flow and the high thermal conductivity of the aluminum-based workpiece means that, immediately after the electrical current ceases, a situation occurs where heat is not disseminated symmetrically from the weld site. Instead, heat is conducted from the hotter steel workpiece through the aluminum-based workpiece towards the welding electrode in contact with the aluminum-based workpiece, which creates a steep thermal gradient between the steel workpiece and the welding electrode.

The development of a steep thermal gradient between the steel workpiece and the welding electrode in contact with the aluminum-based workpiece is believed to weaken the integrity of the resultant weld joint in two primary ways. First, because the steel workpiece retains heat for a longer duration than the aluminum-based workpiece after the electrical current has ceased, the molten weld pool solidifies directionally, starting from the region nearest the colder welding electrode (often water cooled) associated with the aluminum-based workpiece and propagating towards the faying interface. A solidification front of this kind tends to sweep or drive defects—such as gas porosity, shrinkage voids, micro-cracking, and surface oxide residue—towards and along the faying interface within the weld nugget. Second, the sustained elevated temperature in the steel workpiece promotes the growth of brittle Fe—Al intermetallic compounds at and along the faying interface. The intermetallic compounds tend to form thin reaction layers between the weld nugget and the steel workpiece. These intermetallic layers are generally considered part of the weld joint, if present, in addition to the weld nugget. Having a dispersion of weld nugget defects together with excessive growth of Fe—Al intermetallic compounds along the faying interface tends to reduce the peel strength of the final weld joint.

In light of the aforementioned challenges, previous efforts to spot weld a steel workpiece and an aluminum-based workpiece have employed a weld schedule that specifies higher currents, longer weld times, or both (as compared to spot welding steel-to-steel), in order to try and obtain a reasonable weld bond area. Such efforts have been largely unsuccessful in a manufacturing setting and have a tendency to damage the welding electrodes. Given that previous spot welding efforts have not been particularly successful, mechanical processes such as self-piercing rivets and flow-drill screws have predominantly been used instead. Both self-piercing rivets and flow-drill screws are considerably slower and have high consumable costs as compared to spot welding. They also add weight to the vehicle body structure which at some point can begin to counteract the weight savings attained through the use of aluminum-based workpieces in the first place. Advancements in spot welding that would make the process more capable of joining steel and aluminum-based workpieces would thus be a welcome addition to the art.

SUMMARY OF THE DISCLOSURE

A workpiece stack-up that includes at least a steel workpiece and an aluminum-based workpiece can be resistance spot welded—such that a weld joint is formed at a faying interface of the steel and aluminum-based workpieces—by employing a multi-stage spot welding method. The multi-stage spot welding is practiced by controlling the passage of electrical current between opposed spot welding electrodes and through the workpiece stack-up to perform multiple stages of weld joint development that include: (1) a molten weld pool growth stage in which a molten weld pool is initiated and grown within the aluminum-based workpiece; (2) a molten weld pool solidification stage in which the molten weld pool is allowed to cool and solidify into a weld nugget that forms all or part of a weld joint; (3) a weld nugget re-melting stage in which at least a portion of the weld nugget is re-melted; (4) a re-melted weld nugget solidification stage in which the re-melted portion of the weld nugget is allowed to cool and solidify; and optionally (5) a metal expulsion stage in which at least part of the re-melted portion of the weld nugget is expelled along the faying interface of the workpieces.

DETAILED DESCRIPTION

Figure 1:
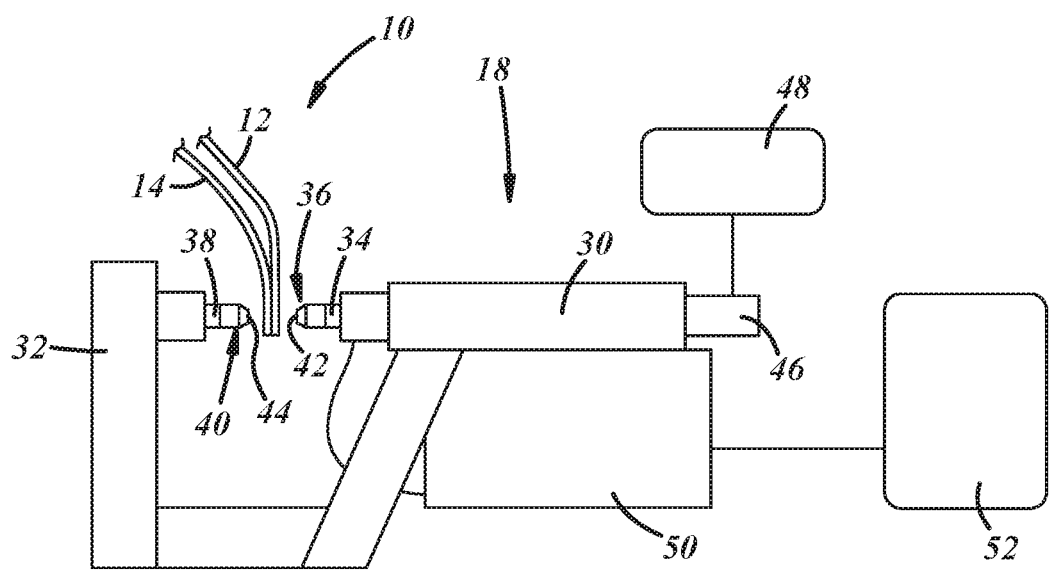
FIG. 1 is a side elevational view of a workpiece stack-up, which includes a steel workpiece and an aluminum-based workpiece, situated between opposed spot welding electrodes of a weld gun in preparation for spot welding.

Spot-welding a steel workpiece and an aluminum-based workpiece (aluminum or aluminum alloys) presents some notable challenges, as discussed above. The surface oxide layer(s) present on the aluminum-based workpiece are difficult to breakdown and disintegrate, which, during traditional spot welding techniques, leads to weld defects at the faying interface in the form of micro-cracks and other disparities caused by residual oxides. Moreover, the steel workpiece is more thermally and electrically resistive than the aluminum-based workpiece, meaning that the steel workpiece acts as a heat source and the aluminum-based workpiece acts as a heat conductor. The resultant thermal gradient established between the workpieces during and just after electrical current flow has a tendency to drive gas porosity and other disparities in the molten weld pool, including the residual oxide defects, towards and along the faying interface, and also contributes to the formation and growth of brittle Fe—Al intermetallic compounds at the faying interface in the form of one or more thin reaction layers on the steel workpiece. A multi-stage spot welding method has been devised that counterbalances these challenges and improves the ability to successfully and repeatedly spot weld steel and aluminum-based workpieces together.

The multi-stage spot welding method invokes control of the electrical current passed between opposed welding electrodes and through the steel and aluminum-based workpieces in order to carry out multiple stages of weld joint development. The multiple stages include: (1) a molten weld pool growth stage in which a molten weld pool is initiated and grown within the aluminum-based workpiece; (2) a molten weld pool solidification stage in which the molten weld pool is allowed to cool and solidify into a weld nugget that forms all or part of a weld joint (the weld joint may also include intermetallic compound layers); (3) a weld nugget re-melting stage in which at least a portion of the weld nugget is re-melted; (4) a re-melted weld nugget solidification stage in which the re-melted portion of the weld nugget is allowed to cool and solidify; and optionally (5) a metal expulsion stage in which at least part of the re-melted portion of the weld nugget is expelled along the faying interface of the workpieces. The several stages of the disclosed method, in particular the weld nugget re-melting stage (stage 3), function to diminish the adverse effects of, and at least partially eradicate, the weld defects in the weld nugget that are believed to weaken the weld joint. The multi-stage spot welding method thus enhances the strength, especially the peel strength, of the ultimately-formed weld joint that gets put into service.

FIGS. 1-7 illustrate exemplary embodiments of the multi-stage spot welding method as performed on a workpiece stack-up 10 by a weld gun 18 that is mechanically and electrically configured to execute spot welding practices in accordance with a programmed weld schedule. The workpiece stack-up 10 includes at least a steel workpiece 12 and an aluminum-based workpiece 14. As shown here in FIGS. 1-2, for example, the workpiece stack-up 10 may include only the steel and aluminum-based workpieces 12, 14. Of course, other metal workpieces may also be included in the stack-up 10, despite not being shown here, such as an additional steel workpiece or an additional aluminum-based workpiece. The term "workpiece" and its steel and aluminum-based variations is used broadly in the present disclosure to refer to a sheet metal layer, a casting, an extrusion, or any other piece that is resistance spot weldable, inclusive of any surface layers or coatings, if present.

The steel workpiece 12 may be coated or uncoated steel. Such workpieces include galvanized (zinc-coated) low carbon steel, low carbon bare steel, galvanized advanced high strength steel (AHSS), and hot-stamped boron steel. Some specific types of steels that may be used in the steel workpiece 12 are interstitial-free (IF) steel, dual-phase (DP) steel, transformation-induced plasticity (TRIP) steel, high-strength low alloy (HSLA) steel, and press-hardened steel (PHS). Regarding the aluminum-based workpiece 14, it may coated or uncoated aluminum or aluminum alloy. Aluminum alloys contain 85 wt. % or more aluminum—such as 5XXX, 6XXX, and 7XXX series aluminum alloys—and can be employed in a variety of tempers. Several types of aluminum alloys that may be employed include an aluminum-magnesium alloy, an aluminum-silicon alloy, an aluminum-magnesium-silicon alloy, or an aluminum-zinc alloy, any of which may be coated with zinc or a conversion coating to improve adhesive bond performance, if desired. Some specific aluminum alloys that may be used in the aluminum-based workpiece 14 are AA5754 and AA5182 aluminum-magnesium alloy, AA6111 and AA6022 aluminum-magnesium-silicon alloy, and AA7003 and 7055 aluminum-zinc alloy.

The steel and aluminum-based workpieces 12, 14 are assembled in overlapping fashion for resistance spot welding at a predetermined weld site 16 by the weld gun 18. When stacked-up for spot welding, the steel workpiece 12 includes a faying surface 20 and an exterior surface 22. Likewise, the aluminum-based workpiece 14 includes a faying surface 24 and an exterior surface 26. The faying surfaces 20, 24 of the two workpieces 12, 14 overlap and contact one another to provide a faying interface 28 at the weld site 16. The faying interface 28, as used herein, encompasses instances of direct contact between the faying surfaces 20, 24 of the workpieces 12, 14 as well as instances of indirect contact in which the faying surfaces 20, 24 are not touching but are in close enough proximity to each another—such as when a thin layer of adhesive, sealer, or some other intermediate material is present—that resistance spot welding can still be practiced. The exterior surfaces 22, 26 of the steel and aluminum-based workpieces 12, 14, on the other hand, generally face away from each other in opposite directions. Each of the steel and aluminum-based workpieces 12, 14 preferably has a thickness 120, 140 that ranges from about 0.3 mm to about 6.0 mm, and more preferably from about 0.5 mm to about 3.0 mm, at least at the weld site 16. The thicknesses 120, 140 of the workpieces 12, 14 can be the same but do not have to be.

The weld gun 18 is shown schematically in FIG. 1 and is one part of a larger automated welding operation within a manufacturing setting. The weld gun 18, for example, may be mounted on a robot positioned in the vicinity of a conveyor or other transport device that is set up to deliver the workpiece stack-up 10 (as well as others like it and others unlike it) to the weld gun 18. The robot may be constructed to move the weld gun 18 along the workpiece stack-up 10, once delivered, so that a rapid succession of spot welds can be formed at many different weld sites 16. The weld gun 18 may also be a stationary pedestal-type weld gun in which the workpiece stack-up 10 is manipulated and moved relative to the weld gun 18 to enable the formation of multiple spot welds at different weld sites 16 around the stack-up 10. The weld gun 18 is, of course, meant to represent other types and arrangements of weld guns not specifically mentioned or described here so long as they are capable of spot welding the workpiece stack-up 10 according to the prescribed multi-step spot welding method.

The weld gun 18 includes a first gun arm 30 and a second gun arm 32 that are mechanically and electrically configured to repeatedly form spot welds in accordance with a defined weld schedule. The first gun arm 30 has a first electrode holder 34 that retains a first spot welding electrode 36, and the second gun arm 32 has a second electrode holder 38 that retains a second spot welding electrode 40. The first and second spot welding electrodes 36, 40 are each preferably formed from an electrically conductive material such as copper alloy. One specific example is a zirconium copper alloy (ZrCu) that contains about 0.10 wt. % to about 0.20 wt. % zirconium and the balance copper. Copper alloys that meet this constituent composition and are designated C15000 are preferred. Other copper alloy compositions that possess suitable mechanical and electrical conductive properties may also be employed.

The first spot welding electrode 36 includes a first weld face 42 and the second spot welding electrode 40 includes a second weld face 44. The weld faces 42, 44 of the first and second spot welding electrodes 36, 40 are the portions of the electrodes 36, 40 that are pressed against, and impressed into, opposite sides of the workpiece stack-up 10 during a spot welding event, which, here, are the exterior surfaces 22, 26 of the workpieces 12, 14. A broad range of electrode weld face designs may be implemented for each spot welding electrode 36, 40. Each of the weld faces 42, 44 may be flat or domed, and may further include surface features (e.g., surface roughness, ringed features, a plateau, etc.) as described, for example, in U.S. Pat. Nos. 6,861,609, 8,222,560, 8,274,010, 8,436,269, and 8,525,066, and U.S. Pat. Pub. No. 2009/0255908. A mechanism for cooling the electrodes 36, 40 with water is also typically incorporated into the gun arms 30, 32 and the electrode holders 34, 38 to manage the temperatures of the spot welding electrodes 36, 40.

The first and second spot welding electrodes 36, 40 can share the same general configuration or a different one. For instance, the weld face 42, 44 of each spot welding electrode 36, 40 may have a diameter between 5 mm and 20 mm, or more narrowly between 8 mm and 12 mm, and a radius of curvature between 5 mm and flat, or more narrowly between 20 mm and 50 mm. Each weld face 42, 44 may further include a series of radially-spaced ringed ridges that project outwardly from a base surface of the weld face 42, 44. Such an electrode weld face design is quite useful when pressed into contact against an aluminum-based workpiece since the ringed ridges function to stretch and breakdown the surface oxide layer(s) on the aluminum-based workpiece to establish better electrical and mechanical contact at the electrode/workpiece junction. The same electrode weld face design is also able to function effectively when pressed into contact against a steel workpiece primarily due to the radius of curvature. The ringed ridges have very little effect on the commutation of current through a steel workpiece and, in fact, are quickly deformed by the stresses associated with being pressed against a steel workpiece during spot welding. In other embodiments, conventional steel and aluminum-based spot welding electrodes known to skilled artisans may be used as the first and second spot welding electrodes 36, 40, respectively, including ball-nose, domed, and flat spot welding electrodes.

Figure 2:
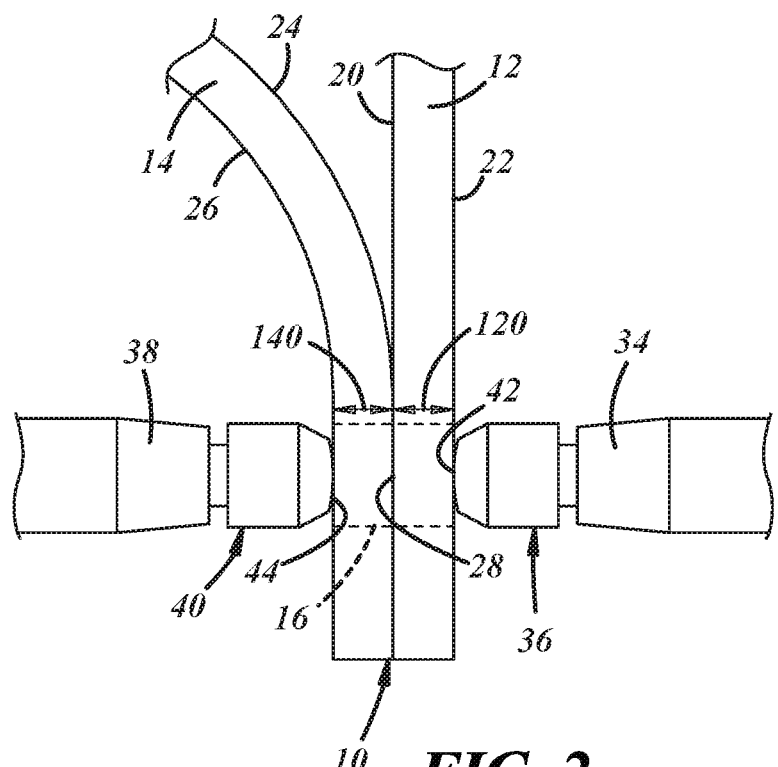
FIG. 2 is a partial magnified view of the workpiece stack-up and the opposed welding electrodes depicted in FIG. 1.

The welding gun arms 30, 32 are operable during spot welding to press the weld faces 42, 44 of the spot welding electrodes 36, 40 against opposite sides of the workpiece stack-up 10. Here, as shown in FIGS. 1-2, the opposite sides of the workpiece stack-up 10 are the oppositely-facing exterior surfaces 22, 26 of the overlapping steel and aluminum-based workpieces 12, 14. In this illustrated embodiment, for example, the first and second gun arms 30, 32 have approximately orthogonal longitudinal axes, and the first gun arm 30 is moveable along its longitudinal axis towards the second gun arm 32 by an actuator 46 such as an air cylinder or a servo motor. An actuator control 48 may cause compressed air to be delivered to the actuator 46, if the actuator 46 is an air cylinder, or it may cause current/voltage to be delivered to the actuator 46, if the actuator 46 is a servo motor, to move the first gun arm 30 as intended to press the weld faces 42, 44 against opposite sides of the workpiece stack-up 10 (surfaces 22, 26) and to apply the desired clamping force. The first and second weld faces 42, 44 are typically pressed against their respective exterior surfaces 22, 26 in diametric alignment with one another at the weld site 16.

The weld gun 18 is also configured to pass electrical current between the first and second spot welding electrodes 36, 40—and through the workpiece stack-up 10 at the weld site 16—when the weld faces 42, 44 of the electrodes 36, 40 are pressed against the opposite sides of the stack-up 10. Electrical current can be delivered to the weld gun 18 from a controllable power supply 50. The power supply 50 is preferably a medium-frequency DC (MFDC) power supply that electrically communicates with the spot welding electrodes 36, 40. A MFDC power supply generally includes a transformer and a rectifier. The transformer "steps down" an input AC voltage—usually about 1000 Hz—to generate a lower-voltage, higher-amperage AC current which is then fed to the rectifier where a collection of semiconductor diodes converts the supplied AC current into a DC current. Such a power supply component is commercially available from a number of suppliers including ARO Welding Technologies (US headquarters in Chesterfield Township, Mich.) and Bosch Rexroth (US headquarters in Charlotte, N.C.).

The power supply 50 is controlled by a weld controller 52 in accordance with a programmed weld schedule. The weld controller 52, which cooperates with the actuator control 48 (by means not shown), interfaces with the power supply 50 and sets the applied current level, duration, and current type (constant, pulsed, etc.) of electrical current being passed between the spot welding electrodes 36, 40 in order to carry out the multi-stage spot welding method. Specifically, the weld controller 52 instructs the power supply 50 to deliver electrical current such that the various stages of weld joint development called for in the multi-stage spot welding method are accomplished. The stages of the multi-stage spot welding method, as mentioned above, include (1) the molten weld pool growth stage, (2) the molten weld pool solidification stage, (3) the weld nugget re-melting stage, (4) the re-melted weld nugget solidification stage, and optionally (5) the metal expulsion stage, each of which will be explained in more detail below.

Figure 3:
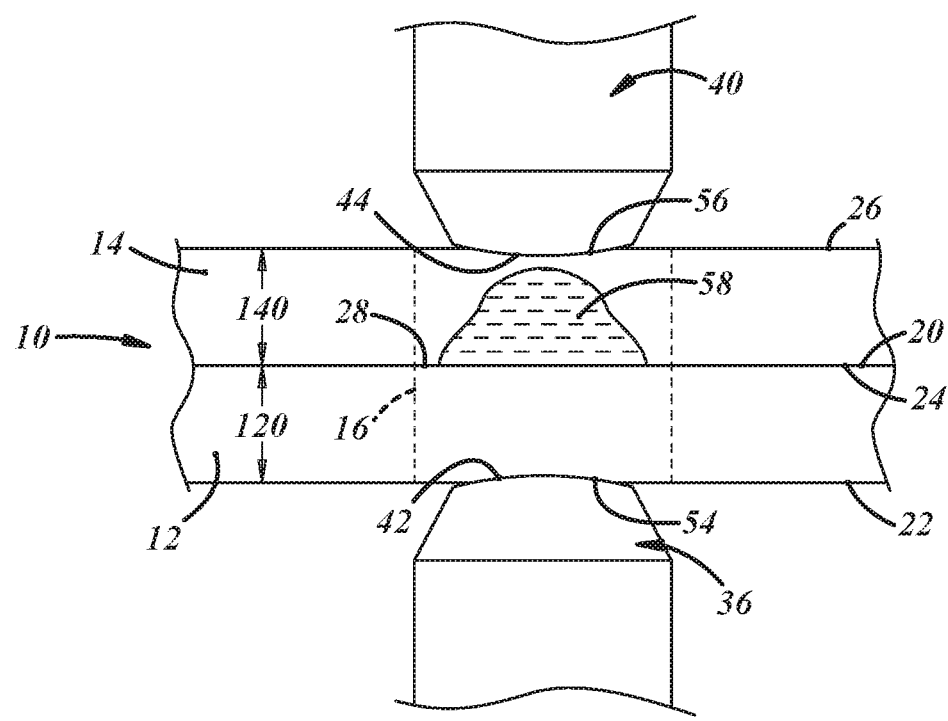
FIG. 3 is a partial cross-sectional view of the workpiece stack-up during part of the multi-stage welding method in which a molten weld pool has been initiated and grown within the aluminum-based workpiece.

Referring now to FIGS. 3-7, the multi-stage spot welding method, including its various stages of weld joint development, is illustrated in general schematic fashion. To begin, the workpiece stack-up 10 is located between the first and second spot welding electrodes 36, 40 so that the weld site 16 is generally aligned with the opposed weld faces 42, 44. The workpiece stack-up 10 may be brought to such a location, as is often the case when the gun arms 30, 32 are part of a stationary pedestal welder, or the gun arms 30, 32 may be robotically moved to locate the electrodes 36, 40 relative to the weld site 16. Once the stack-up 10 is properly located, the first and second gun arms 30, 32 converge relative to one another to contact and press the weld faces 42, 44 of the first and second spot welding electrodes 36, 40 against opposite sides of the stack-up 10 at the weld site 16, which, in this embodiment, are the oppositely-facing exterior surfaces 22, 26 of the steel and aluminum-based workpieces 12, 14, as shown in FIG. 3. Upon making contact with the workpiece stack-up 10 under pressure, the first and second weld faces 42, 44 impress into their respective opposite side surfaces of the stack-up 10. The resultant indentations originated by the opposed weld faces 42, 44 are referred to here as a first contact patch 54 and a second contact patch 56.

The molten weld pool growth stage is commenced once the spot welding electrodes 36, 40 are pressed against the workpiece stack-up 10 at the weld site 16. During the molten weld pool growth stage, a molten weld pool 58 is initiated and grown within the aluminum-based workpiece 14, as schematically depicted in FIG. 3. The molten weld pool 58 extends from the faying interface 28 of the workpieces 12, 14 into the aluminum-based workpiece 14. And it is composed predominantly of molten aluminum-based material from the aluminum-based workpiece 14 since the steel workpiece 12 typically does not melt. The molten weld pool 58 may penetrate a distance into the aluminum-based workpiece 14 that ranges from 20% to 100% (i.e., all the way through the aluminum-based workpiece 14) of the thickness 140 of the aluminum-based workpiece 14 at the weld site 16. The thickness 140 of the aluminum-based workpiece 14 at the weld site 16 is typically less than the thickness outside of the weld site 16 due to the indentation of the second contact patch 56 on the workpiece stack-up 10. The portion of the molten weld pool 58 adjacent to the faying interface 28, consequently, wets the faying surface 20 of the steel workpiece 12.

The molten weld pool 58 is initiated and grown by passing electrical current between the spot welding electrodes 36, 40 and through the workpieces 12, 14 and across their faying interface 28 for a first period of time. Resistance to the flow of the electrical current through the workpieces 12, 14 and across the faying interface 28 generates heat and initially heats up the steel workpiece 12 more quickly than the aluminum-based workpiece 14. The generated heat eventually initiates the molten weld pool 58 and then continues to grow the molten weld pool 58 to its desired size. Indeed, at the beginning of electrical current flow when the second contact patch 56 is smallest in area and current density is highest, the molten weld pool 58 initiates quickly and rapidly grows and penetrates into the aluminum-based workpiece 14. As the second contact patch 56 formed by the weld face 44 of the second spot welding electrode 40 increases in area over the course of electrical current flow, the electrical current density decreases and the molten weld pool 58 grows more laterally in the vicinity of the faying interface 28.

When carrying out the molten weld pool growth stage, the level of the applied electrical current and the duration of the first period of time depend on several factors. The main factors that influence the electrical current level and duration are the thicknesses 120, 140 of the steel and aluminum-based workpieces 12, 14 at the weld site 16 and the exact compositions of the workpieces 12, 14. In some instances, though, the electrical current passed during the weld pool growth stage is a constant direct current (DC) that has a current level between 4 kA and 40 kA and the duration of electrical current flow is between 50 ms and 500 ms. The electrical current, alternatively, may be pulsed, in which over the course of the first period of time, the passing electrical current is a plurality of current pulses. Each of the current pulses may last from 10 ms to 200 ms and have a peak current level between 10 kA and 50 kA, with periods of zero current flow lasting from 1 ms to 100 ms between pulses. Other current levels and durations of the first period of time may of course be employed and, in fact, skilled artisans will know and understand how to adjust these parameters accordingly in order to satisfy the molten weld pool growth stage.

Figure 4:
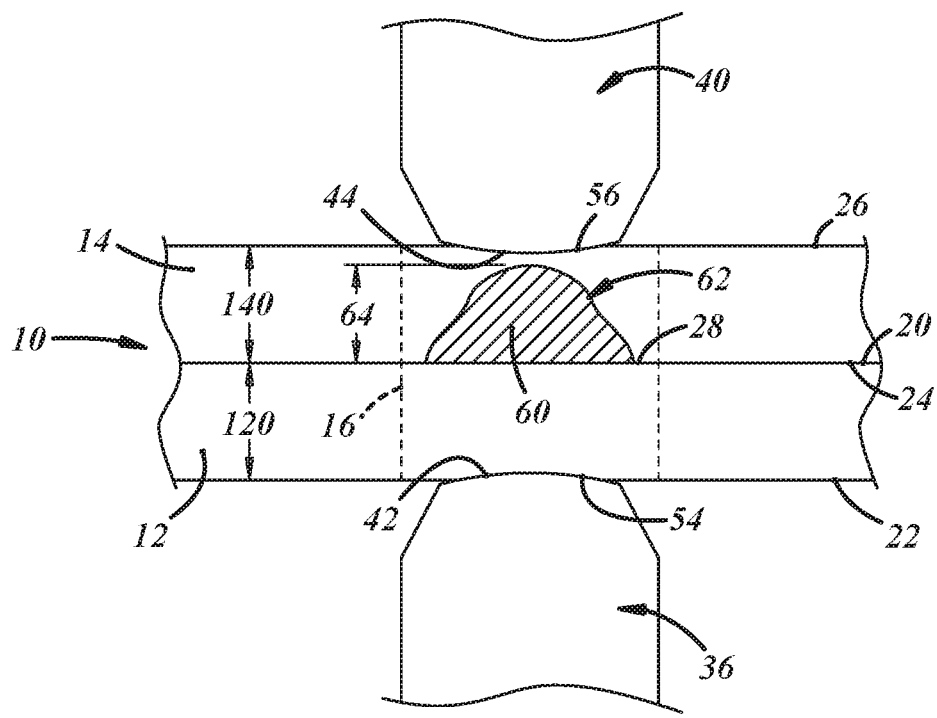
FIG. 4 is a partial cross-sectional view of the workpiece stack-up during part of the multi-stage welding method after the molten weld pool has been allowed to cool and solidify into a weld nugget that forms all or part of a weld joint.

After the molten weld pool has been initiated and grown, the molten weld pool solidification stage is carried out. During the molten weld pool solidification stage, the molten weld pool 58 is allowed to cool and solidify into a weld nugget 60 that forms all or part of a weld joint 62, as illustrated in FIG. 4. Cooling and solidification of the molten weld pool 58 can be realized over a second period of time in one of two ways. First, passage of electrical current between the first and second spot welding electrodes 36, 40 can be ceased. And second, if ceasing electrical current flow altogether is not desired, electrical current can be passed between the first and second spot welding electrodes 36, 40 at a reduced level that would be unable to maintain the molten state of the weld pool 58, thus allowing the molten weld pool 58 to cool and solidify, albeit at a slower rate than ceasing electrical current flow entirely. Again, like before, the duration of the second period of time and the reduced current level (which allows solidification to happen) may vary depending on the thicknesses 120, 140 of the workpieces 12, 14 at the weld site 16 and the actual compositions of the workpieces 12, 14. Passing an electrical current below 5 kA, or ceasing current, for between 50 ms and 1000 ms is usually sufficient to solidify the molten weld pool 58 into the weld nugget 60.

Figure 7:
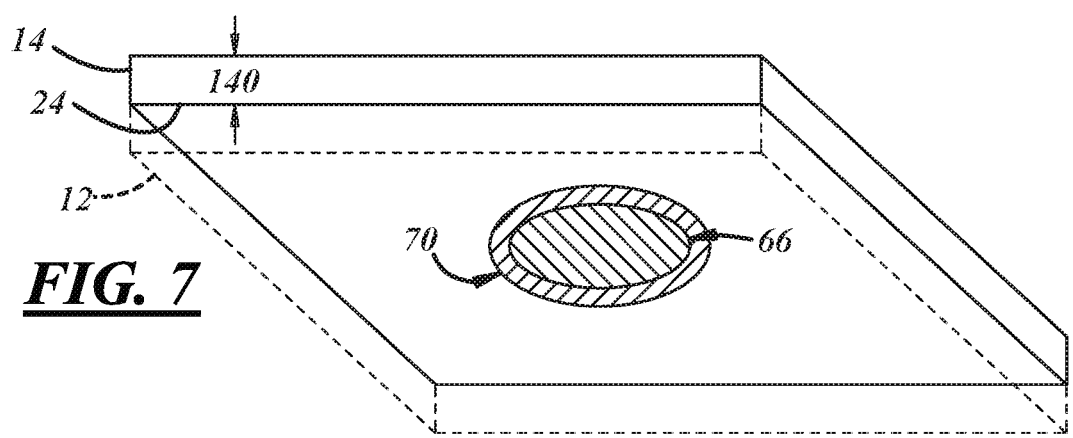
FIG. 7 is a perspective view of the workpiece stack-up, from the bottom, in which the steel workpiece is shown in phantom to schematically illustrate the weld bond area of the weld nugget as well as the possible additional weld bond area that may be attained as a result of re-melting at least a portion of the weld nugget during the multi-stage welding method.

The weld nugget 60 extends a distance from the faying interface 28 into the aluminum-based workpiece 14 to a penetration depth 64. The penetration depth 64 of the weld nugget 60 may range from 20% to 100% (i.e., all the way through the aluminum-based workpiece 14) of the thickness 140 of the aluminum-based workpiece 14 at the weld site 16. The thickness 140 of the aluminum-based workpiece 14 at the weld site 16, as before, is typically less than the thickness outside of the weld site 16 due to the indentation of the second contact patch 56 on the workpiece stack-up 10. Additionally, the weld nugget 60 defines a weld bond area 66, as shown in FIG. 7, which is the surface area of the weld nugget 60 adjacent with and joined to the faying surface 20 of the steel workpiece 12 by way of intervening intermetallic Fe—Al reaction layers. The weld bond area 66, as reported in mm², is preferably at least $4(\pi)(t)$ in which "t" is the thickness 140 of the aluminum-based workpiece 14 in millimeters at the weld site 16 prior to origination of the second contact patch 56. In other words, when calculating the preferred $4(\pi)(t)$ weld bond area, the thickness "t" of the aluminum-based workpiece 14 is the original thickness of the workpiece 14 as measured prior to indentation of the weld face 44 of the second spot welding electrode 40. The weld bond area 66 can be varied as desired by managing the size of the molten weld pool 58 grown in the molten weld pool growth stage.

The weld nugget 60 may include weld defects dispersed at and along the faying interface 28 within the weld bond area 66. These defects—which can include gas porosity, shrinkage voids, micro-cracking, and surface oxide residue—are believed to be swept towards the faying interface 28 during solidification of the molten weld pool 58 where they have a tendency weaken the strength of the weld joint 62, in particular the peel strength, as previously explained. The weld joint 62 may also include, in addition to the weld nugget 60, one or more thin reaction layers of Fe—Al intermetallic compounds (not shown) on the steel workpiece 12 and adjacent to the faying interface 28, as previously indicated. These layers are produced mainly as a result of reaction between the molten weld pool 58 and the steel workpiece 12 at spot welding temperatures. The one or more layers of Fe—Al intermetallic compounds may include intermetallics such as $FeAl_3$, $Fe_2Al_5$, as well others, and their combined thickness typically ranges from 1 μm to 10 μm. The hard and brittle nature of the Fe—Al intermetallic compounds is also thought to negatively affect the strength of the overall weld joint 62.

Figure 5:
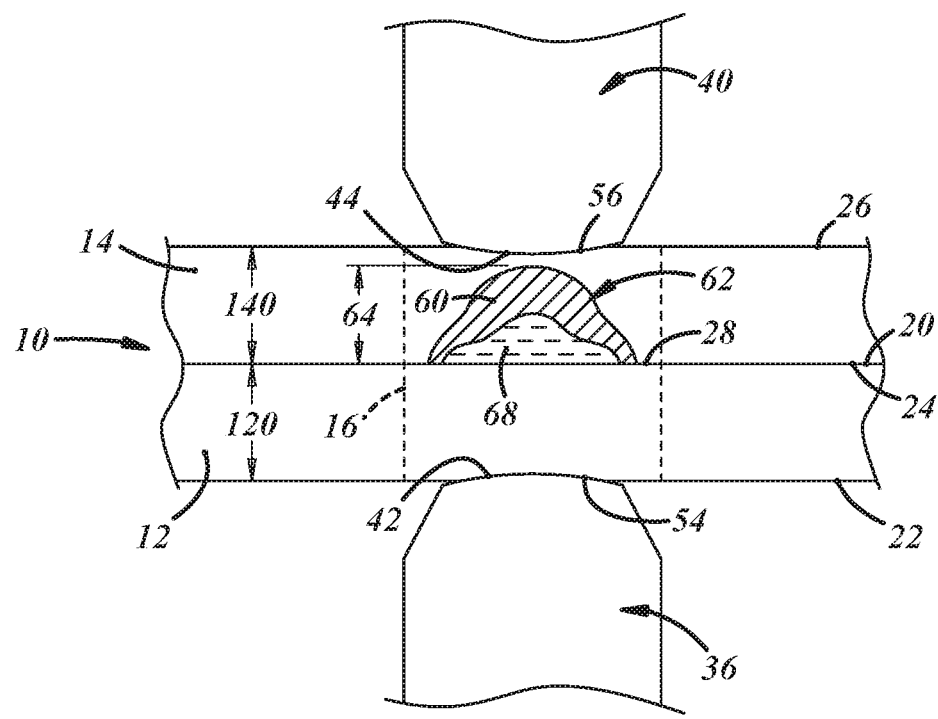
FIG. 5 is a partial cross-sectional view of the workpiece stack-up during part of the multi-stage welding method in which at least a portion of the weld nugget has been re-melted.

After the weld joint 62 has been established, the weld nugget re-melting stage is performed. During the weld nugget re-melting stage, at least a portion 68 of the weld nugget 60 is re-melted, as depicted in FIG. 5. The re-melted portion 68 of the weld nugget 60 preferably includes at least part of the weld bond area 66 that was established during the molten weld pool solidification stage. It also typically does not extend all the way to the penetration depth 64 of the weld nugget 60. The shallower penetration of the re-melted portion 68 occurs because at the time of the weld nugget re-melting stage, the weld face 44 of the second spot welding electrode 40 has indented further into the workpiece stack-up 10, and the second contact patch 56 has correspondingly increased in size, meaning that electrical current is passed between the spot welding electrodes 36, 40 over a broader area, which has the effect of promoting re-melting closer to the faying interface 28 with less penetration into the aluminum-based workpiece 14. The re-melted portion 68 of the weld nugget 60, moreover, may be entirely confined within the weld bond area 66 or it may encompass the entire weld bond area 66 and actually combine with freshly melted material from the aluminum-based workpiece 14 outside of, and adjacent to, the weld bond area 66 to established an enlarged weld bond area 70 (FIG. 7). The area of the enlarged weld bond area 70, if created, may be up to 50% greater than the weld bond area 66 of the weld nugget 60 before re-melting.

The weld nugget 60 is at least partially re-melted by passing electrical current between the spot welding electrodes 36, 40 and through the workpieces 12, 14 for a third period of time following the molten weld pool solidification stage. Passage of electrical current, here, is generally done at a higher level than in the molten weld pool growth stage since the weld face 44 of the second spot welding electrode 40 is further impressed into the workpiece stack-up 10 and the faying interface 28 is less liable to generate heat within the weld site 16 since the weld joint 62 is more electrically conductive than the distinct, unjoined faying surfaces 20, 24 of the workpieces 12, 14. Again, the level of the applied electrical current and the duration of the third period of time depend on the thicknesses 120, 140 of the steel and aluminum-based workpieces 12, 14 at the weld site 16 and the exact compositions of the workpieces 12, 14. But, in some instances, the electrical current passed during the weld nugget re-melting stage may be a constant direct current (DC) that has a current level between 10 kA and 50 kA and the duration of electrical current flow may be between 100 ms and 2000 ms. The electrical current can also be pulsed.

The electrical current delivered during the weld nugget re-melting stage is preferably in the form of current pulses that may or may not increase in applied current level over the course of the third period of time. Like before, when pulsed, the passing electrical current is a plurality of current pulses delivered over the third period of time. Each current pulse may last from 10 ms to 200 ms and have a peak current level between, for example, 15 kA and 50 kA, with periods of zero current flow lasting from, for example, 1 ms to 100 ms between pulses. The current pulses can be said to increase in applied current level when at least 75% of the current pulses, and preferably 100%, attain a peak current level that is greater than the peak current level of the immediately preceding current pulse. The use of current pulses may be practiced in the weld nugget re-melting stage for several reasons. Most notably, the use of current pulses helps prevent excessive penetration of the re-melted portion 68 of the weld nugget 60 by keeping the electrode/workpiece cool, which also has the benefit of preserving the operational lifetime of the second spot welding electrode 40.

The re-melting of the weld nugget 60 is believed to positively impact the strength, including the peel strength, of the ultimately-formed weld joint 62 that is placed into service. Without being bound by theory, it is believed that re-melting the weld nugget 60, especially the weld bond area 66 at the faying interface 28, cleans out the various weld defects that get driven to and along the faying interface 28 during solidification of the molten weld pool 58, thus improving the ability of the weld nugget 60 to bond with the faying surface 20 of the steel workpiece 12. The creation of the re-melted portion 68, for example, is thought to consolidate entrained gas porosity near the center of the weld nugget 62, and possibly evolve some gas from the re-melted portion 68, while thermal expansion and contraction of the weld nugget 60 during re-melting is thought to break up and disperse residual oxides and micro-cracks that may be present at the weld bond area 66 or in the vicinity.

Figure 6:
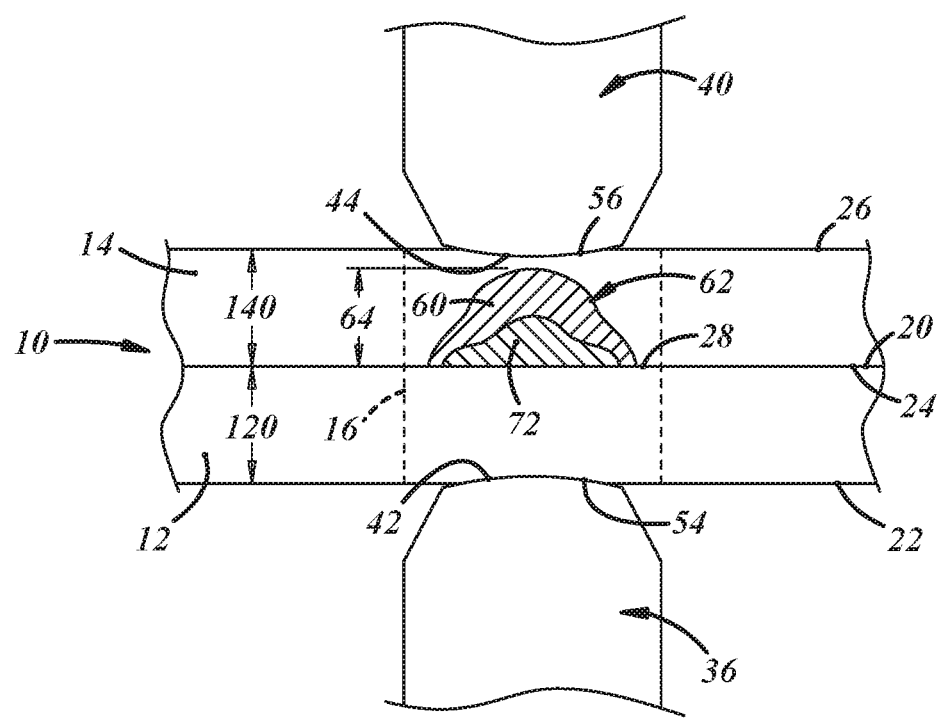
FIG. 6 is a partial cross-sectional view of the workpiece stack-up after the re-melted portion of the weld nugget has been allowed to cool and solidify.

Following the weld nugget re-melting stage, the re-melted weld nugget solidification stage is performed. During the re-melted weld nugget solidification stage, the re-melted portion 68 of the weld nugget 60 (as well as any newly melted material of the aluminum-based workpiece 14 outside of the original weld bond area 66) is allowed to cool and solidify, as shown in FIG. 6, preferably with the first and second spot welding electrodes 36, 40 still pressed against the workpiece stack-up 10. The re-solidified portion 72 of the weld nugget 60, which is derived from the re-melted portion 68, is depicted here as a distinct part of the weld nugget 60 although, in actual practice, the re-solidified portion 72 may not be easily distinguishable from the part(s) of the weld nugget 60 (if any) that do not undergo re-melting and re-solidification. And, as alluded to above, the re-solidified portion 72 of the weld nugget 60 is believed to contain less weld defects at or near the faying interface 28 than would otherwise be present had the weld nugget re-melting stage not been practiced. To be sure, it is not uncommon for workpiece stack-ups that have undergone the multi-stage spot welding method to have peel strengths of at least 100% greater than the same workpiece stack-ups that have been spot welded with a conventional single-step constant current.

The multi-stage spot welding method set forth above may also include an optional metal expulsion stage during or after the weld nugget re-melting stage but prior to the re-melted weld nugget solidification stage. During the metal expulsion stage, at least part of the re-melted portion 68 of the weld nugget 60 is heated to the extent that the hydraulic seal established at the weld site 16 is broken, resulting in the faying surfaces 20, 24 of the steel and aluminum-based workpieces 12, 14 being pushed apart briefly (as well as the first and second spot welding electrodes 36, 40). The re-melted portion 68 of the weld nugget 60, and possibly some of the newly melted material of the aluminum-based workpiece 14 outside of the original weld bond area 66, if present, expels or spatters laterally along the faying interface 28 outside of the weld bond area 66 at this time until the workpieces eventually collapse 12, 14 due to the loss of molten material and the applied pressure of the first and second spot welding electrodes 36, 40. It is believed that such metal expulsion, if practiced, helps further clean the weld nugget 60 of weld defects by physically expelling the defects outside of the weld bond area 66 (or the enlarged weld bond area 70 if applicable). While metal expulsion is deemed beneficial, the heating of the re-melted portion 68 is preferably controlled so that the thickness 140 of the aluminum-based workpiece 14 at the weld site 16 is not reduced to less than 50% of its original thickness, which is measured prior to indentation of the weld face 44 of the second spot welding electrode 40, as a result of the metal expulsion stage.

The metal expulsion stage can be accomplished by passing electrical current between the spot welding electrodes 36, 40 and through the workpieces 12, 14 in one of two ways. First, the third period of time can be set so that passage of electrical current during the weld nugget re-melting stage continues and ultimately causes metal expulsion at the end of the third period of time. The weld nugget re-melting stage and the metal expulsion stage can thus overlap. When this option is pursued, the third period of time typically lasts for 100 ms or greater, although shorter and longer periods are certainly possible depending on the thicknesses 120, 140 and compositions of the workpieces 12, 14. Second, electrical current can be passed for a fourth period of time, after the third period of time associated with the weld nugget re-melting stage, during which the electrical current is raised to a higher level than the electrical current passed during the third period of time. For example, in this scenario, a direct current may be passed that has a constant current level between 20 kA and 50 kA and the duration of electrical current flow over the fourth period of time may be between 20 ms and 200 ms.

After the multi-stage spot welding method has resulted in the formation of the weld joint 62, including the weld nugget 60 having the re-solidified portion 72, the first and second spot welding electrodes 36, 40 are retracted from their respective contact patches 54, 56. The workpiece stack-up 10 is then successively located relative to the weld gun 18 at other weld sites 16, and the multi-stage spot welding process is repeated at those sites 16, or the workpiece stack-up 10 is moved away from the weld gun 18 to make way for another stack-up. The above-described multi-stage spot welding method can thus be carried out many times at different weld sites on the same workpiece stack-up as well as different workpiece stack-ups in a manufacturing setting to successfully, consistently, and reliably form weld joints between a steel workpiece and an aluminum-based workpiece.

EXAMPLES

Figure 8:
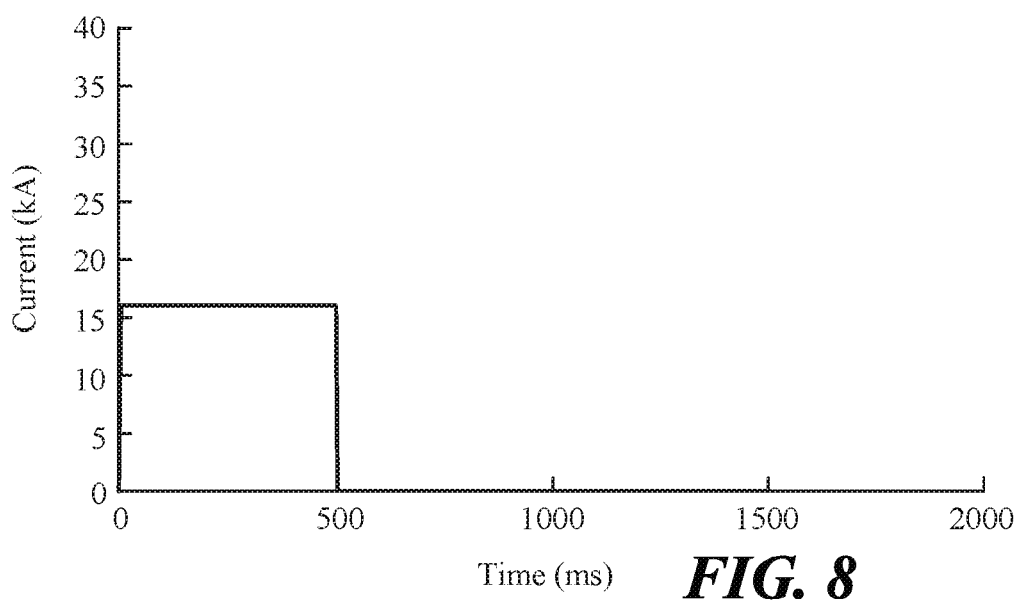
FIG. 8 is a weld schedule depicting a single step constant current that has conventionally been used in spot welding applications.

The following examples demonstrate several embodiments of the disclosed multi-stage spot welding method. The weld schedule of a conventional spot welding method that employs a single step constant electrical current to weld a 1.2-mm 6022 aluminum alloy workpiece to a 1.0-mm hot-dip galvanized low carbon steel workpiece is also illustrated in FIG. 8 for comparative purposes. There, as can be seen, electrical current is passed between the spot welding electrodes and through the workpiece stack-up at a constant current level (after a rapid initial ramp up) of 16 kA for 500 ms under 800 lb of force. In contrast, as described below in Examples 1-5 and illustrated in FIGS. 9-13, spot weld joints are formed by controlling passage of electrical current between the spot welding electrodes and through the workpiece stack-ups in order to carry out, in order, a molten weld pool growth stage, a molten weld pool solidification stage, a weld nugget re-melting stage, and a re-melted weld nugget solidification stage. Each of the examples, moreover, employs an optional metal expulsion stage before the re-melted weld nugget solidification stage.

Example 1

Figure 9:
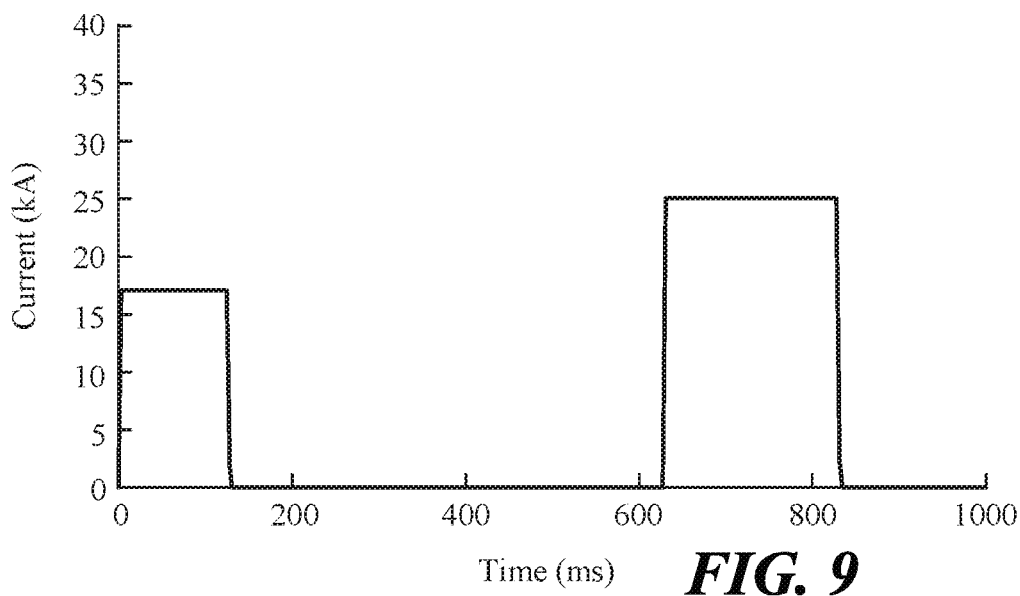
FIG. 9 is a weld schedule showing one example of the disclosed multi-stage spot welding method.

Here, in the first example, a 1.2-mm 6022 aluminum alloy workpiece was spot welded to a 1.0-mm hot-dip galvanized low carbon steel workpiece by the multi-stage spot welding method under 800 lb of force applied by the spot welding electrodes. The weld schedule is depicted in FIG. 9. As shown, electrical current at a constant level of 17 kA was first passed through the workpieces for a first period of 125 ms to initiate and grow a molten weld pool within the aluminum alloy workpiece. Next, passage of electrical current was ceased, i.e., dropped to 0 kA, for a second period of 500 ms to solidify the molten weld pool into a weld nugget, which along with one or more Fe—Al intermetallic layers formed a weld joint between the steel and aluminum alloy workpieces. Electrical current was then re-started and passed through the workpieces to re-melt at least a portion of the weld nugget and, additionally, to cause metal expulsion at the faying interface of the workpieces. The electrical current passed at that time had a constant current level of 25 kA and was maintained for a third period of 200 ms. After the third period of time, passage of electrical current was again ceased while the force of the electrodes was maintained to solidify the re-melted portion of the weld nugget.

Example 2

Figure 10:
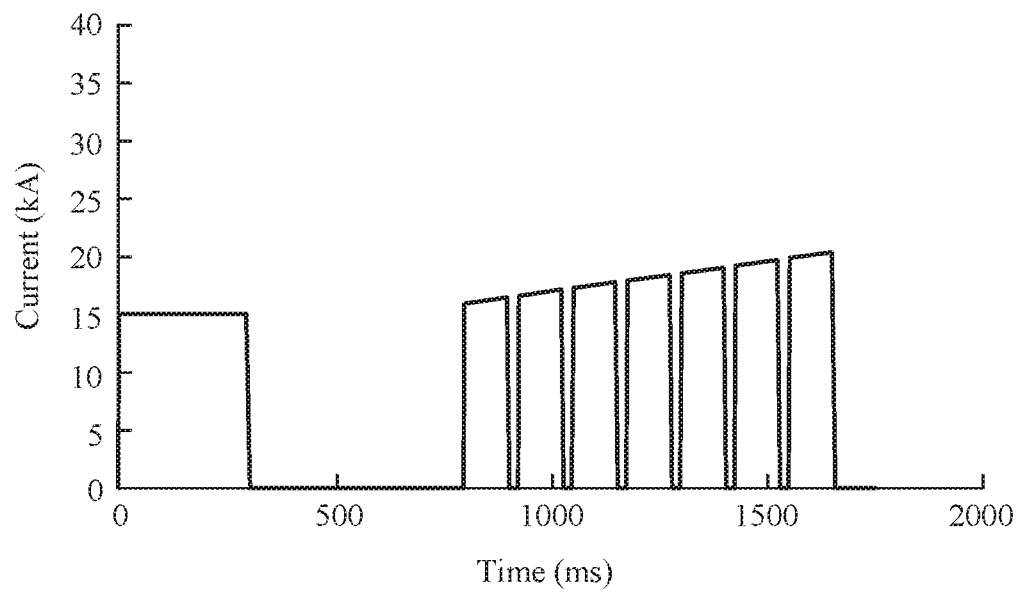
FIG. 10 is a weld schedule showing another example of the disclosed multi-stage spot welding method.

In this example, which is depicted in FIG. 10, a 1.2-mm 6022 aluminum alloy workpiece was spot welded to a 1.0-mm hot-dip galvanized low carbon steel workpiece by the multi-stage spot welding method under 700 lb of force applied by the spot welding electrodes. As shown, electrical current at a constant current level of 15 kA was passed through the workpieces for a first period of 300 ms to initiate and grow a molten weld pool within the aluminum alloy workpiece. Next, passage of electrical current was ceased for a second period of 500 ms to solidify the molten weld pool into a weld nugget, which along with one or more Fe—Al intermetallic layers formed a weld joint between the steel and aluminum alloy workpieces. Electrical current was then passed in the form of seven current pulses to re-melt at least a portion of the weld nugget and, additionally, to cause metal expulsion at the faying interface of the workpieces. The seven current pulses increased in applied current level in the range of 16 kA to 20.5 kA over a third period of approximately 860 ms. Specifically, each current pulse lasted for 100 ms while increasing in current level, then dropped to 0 kA for a period of 25 ms between pulses, and the peak current levels of each pulse increased from its immediately succeeding pulse (16.5 kA<17.2 kA<17.8 kA<18.5 kA<19.1 kA<19.8 kA<20.4 kA). After the seventh and last current pulse, passage of the electrical current was again ceased while the force of the electrodes was maintained to solidify the re-melted portion of the weld nugget.

Example 3

Figure 11:
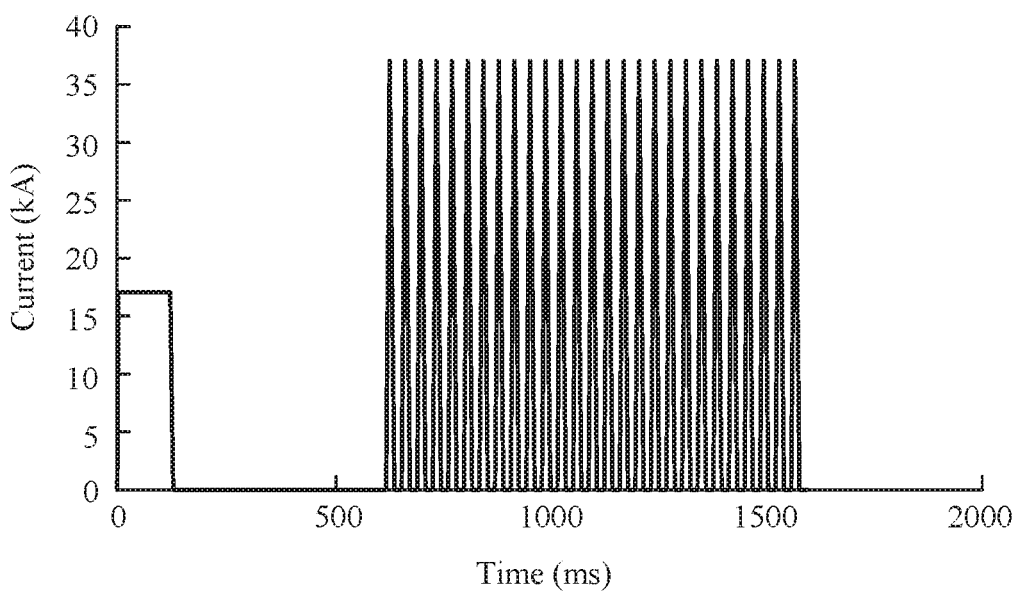
FIG. 11 is a weld schedule showing yet another example of the disclosed multi-stage spot welding method.

In this example, which is depicted in FIG. 11, a 2.0-mm 6022 aluminum alloy workpiece was spot welded to a 1.0-mm hot-dip galvanized low carbon steel workpiece by the multi-stage spot welding method under 800 lb of force applied by the spot welding electrodes. Here, as shown, electrical current at a constant current level of 17 kA was passed through the workpieces for a first period of 125 ms to initiate and grow a molten weld pool within the aluminum alloy workpiece. Next, passage of electrical current was ceased for a second period of 500 ms to solidify the molten weld pool into a weld nugget, which along with one or more Fe—Al intermetallic layers formed a weld joint between the steel and aluminum alloy workpieces. Electrical current was then passed in the form of twenty seven current pulses over a third period of approximately 960 ms to re-melt at least a portion of the weld nugget and, additionally, to cause metal expulsion at the faying interface. Each current pulse reached a current level of 37 kA and maintained that level for 12 ms before dropping to 0 kA for a period of 24 ms between pulses. After the twenty-seventh and last current pulse, passage of the electrical current was again ceased while the force of the electrodes was maintained to solidify the re-melted portion of the weld nugget.

Example 4

Figure 12:
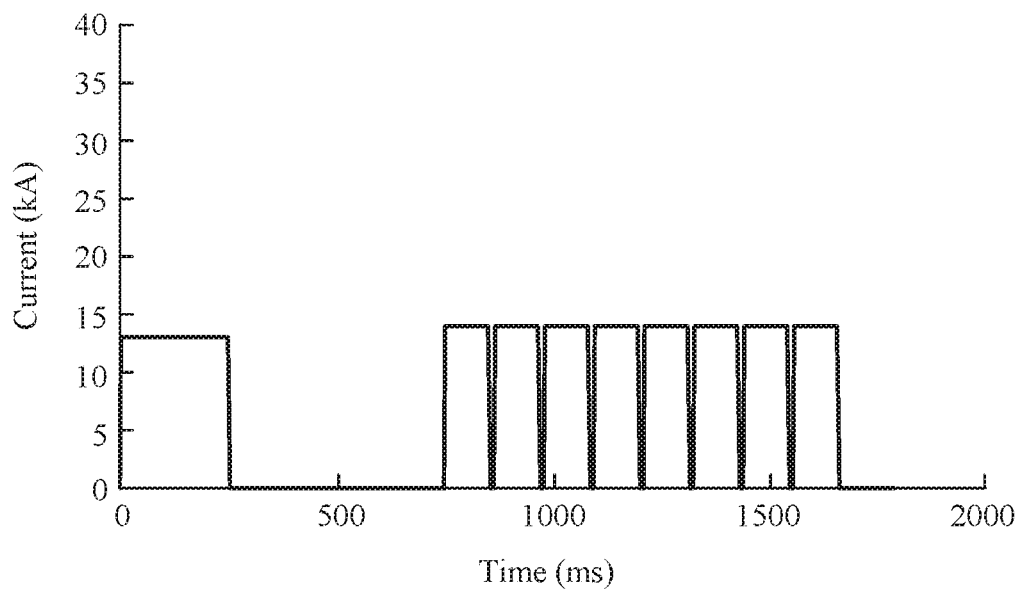
FIG. 12 is a weld schedule showing still another example of the disclosed multi-stage spot welding method.

In this example, which is depicted in FIG. 12, a 1.2-mm 6022 aluminum alloy workpiece was spot welded to a 2.0-mm hot-dip galvanized low carbon steel workpiece by the multi-stage spot welding method under 600 lb of force applied by the spot welding electrodes. Here, electrical current at a constant level of 13 kA was passed through the workpieces for a first period of 250 ms to initiate and grow a molten weld pool within the aluminum alloy workpiece. Next, passage of electrical current was ceased for a second period of 500 ms to solidify the molten weld pool into a weld nugget, which along with one or more Fe—Al intermetallic layers formed a weld joint between the steel and aluminum alloy workpieces. Electrical current was then passed in the form of eight current pulses over a third period of approximately 910 ms to re-melt at least a portion of the weld nugget and, additionally, to cause metal expulsion at the faying interface. Specifically, each current pulse reached a current level of 14 kA and maintained that level for 100 ms before dropping to 0 kA for a period of 15 ms between pulses. After the eighth and last current pulse, passage of the electrical current was again ceased while the force of the electrodes was maintained to solidify the re-melted portion of the weld nugget.

Example 5

Figure 13:
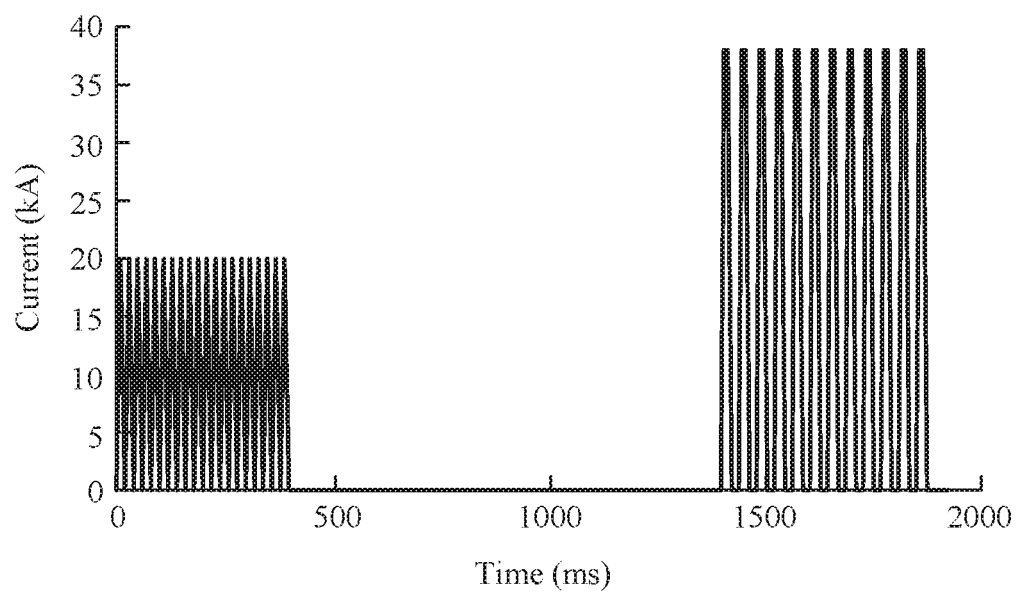
FIG. 13 is a weld schedule showing still another example of the disclosed multi-stage spot welding method.

In this example, which is depicted in FIG. 13, a 2.0-mm 6022 aluminum alloy workpiece was spot welded to a 2.0-mm hot-dip galvanized low carbon steel workpiece by the multi-stage spot welding method under 1200 lb of force applied by the spot welding electrodes. To begin, as shown, electrical current was passed in the form of 20 current pulses over a first period of approximately 400 ms to initiate and grow a molten weld pool within the aluminum alloy workpiece. Each current pulse reached a current level of 20 kA and maintained that level for 16 ms before dropping to 0 kA for a period of 4 ms between pulses. Next, passage of electrical current was ceased for a second period of 1000 ms to solidify the molten weld pool into a weld nugget, which along with one or more Fe—Al intermetallic layers formed a weld joint between the steel and aluminum alloy workpieces. Electrical current was then passed in the form of twelve current pulses over a third period of approximately 480 ms to re-melt at least a portion of the weld nugget and, additionally, to cause metal expulsion at the faying interface. Each current pulse reached a current level of 38 kA and maintained that level for 16 ms before dropping to 0 kA for a period of 25 ms between pulses. After the twelfth and last current pulse, passage of the electrical current was again ceased while the force of the electrodes was maintained to solidify the re-melted portion of the weld nugget.

Peel Strength Comparison

The following table compares the peel strengths of the conventional single-step constant electrical current welding method (FIG. 8) to the five exemplary multi-step spot welding methods (FIGS. 9-13). Weld joint peel strength is noteworthy property for weld joints. This is especially true for weld joints used in conjunction with a structural adhesive since adhesives generally provide shear strength, but perform poorly in peel. The peel strengths reported here were measured with T-peel samples. The T-peel samples were obtained by first bending coupons (5 in. by 1.5 in.) into an L-shape. The short legs of two L-shape coupons were then mated and a weld joint was formed according to the above detailed spot welding methods between the mating surfaces. The long legs of the resultant T-peel samples were mounted in a tensile machine and the pulled until the weld joint failed. Maximum loading in Newtons (N) is reported as the peel strength. As can be seen, the peel strengths obtained from the multi-stage spot welding methods were significantly greater than the peel strength obtained from the conventional single-step spot welding method.

COMPARISON OF PEEL STRENGTHS

| Spot Welding Method | Peel Strength (N) |
| --- | --- |
| Conventional (FIG. 8) | 90 |
| Multi-Step (FIG. 9) | 220 |
| Multi-Step (FIG. 10) | 290 |
| Multi-Step (FIG. 11) | 260 |
| Multi-Step (FIG. 12) | 400 |
| Multi-Step (FIG. 13) | 810 |

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding a workpiece stack-up, which includes an aluminum-based workpiece and a steel workpiece, so as to form a resistance spot weld joint between the aluminum-based workpiece and the steel workpiece, the method comprising:
    contacting a workpiece stack-up with a pair of spot welding electrodes such that the spot welding electrodes make contact with opposed sides of the workpiece stack-up, the workpiece stack-up comprising the aluminum-based workpiece and the steel workpiece, the aluminum-based workpiece having a faying surface and the steel workpiece having a faying surface, and wherein the faying surfaces of the aluminum-based workpiece and the steel workpiece overlap and confront one another; and
    controlling the passage of electrical current between the spot welding electrodes and through the aluminum-based workpiece and the steel workpiece to perform multiple stages of weld joint development that include:
        passing electrical current through the aluminum-based workpiece and the steel workpiece for a first period of time to grow a molten weld pool within the aluminum-based workpiece, wherein the first period of time is adjusted based on at least respective thicknesses at a weld site and compositions of the aluminum-based workpiece and the steel workpiece to create the molten weld pool;
        reducing passage of electrical current or ceasing passage of electrical current through the aluminum-based workpiece and the steel workpiece for a second period of time after the first period of time to allow the molten weld pool to cool and solidify to establish a weld bond area adjacent with and joined to the faying surface of the steel workpiece, wherein the second period of time is adjusted based on at least the respective thicknesses at the weld site and the compositions of the aluminum-based workpiece and the steel workpiece to establish the weld bond area; and
        passing electrical current through the aluminum-based workpiece and the steel workpiece for a third period of time after the second period of time to re-melt at least part of the weld bond area, wherein the third period of time is adjusted based on at least the respective thicknesses at the weld site and the compositions of the aluminum-based workpiece and the steel workpiece to re-melt the at least part of the weld bond area.

2. The method set forth in claim 1, wherein controlling the passage of electrical current between the spot welding electrodes and through the aluminum-based workpiece and the steel workpiece further includes:
    ceasing passage of electrical current after the third period of time to allow the part of the weld bond area that has been re-melted to cool and solidify.

3. The method set forth in claim 2, wherein controlling the passage of electrical current between the spot welding electrodes and through the aluminum-based workpiece and the steel workpiece further includes:

expelling at least some of the part of the weld bond area that has been re-melted between the aluminum-based workpiece and the steel workpiece before allowing the part of the weld bond area that has been re-melted to solidify.

4. The method set forth in claim 3, wherein the expelling is caused by passing electrical current through the aluminum-based workpiece and the steel workpiece for a fourth period of time, after the third period of time, during which electrical current is raised to a higher level than in the third period of time.

5. The method set forth in claim 1, wherein electrical current in the form of current pulses is passed between the spot welding electrodes during the first period of time.

6. The method set forth in claim 1, wherein electrical current in the form of current pulses is passed between the spot welding electrodes during the third period of time to re-melt at least a portion of a weld nugget.

7. The method set forth in claim 1, wherein up to 100% of the weld bond area is re-melted during the third period of time.

8. The method set forth in claim 1, wherein the entire weld bond area is re-melted during the third period of time and further combines with molten material of the aluminum-based workpiece to establish an enlarged weld bond area.

9. The method set forth in claim 8, wherein the enlarged weld bond area is up to 50% greater in area than the weld bond area before re melting.

10. The method set forth in claim 1, wherein the steel workpiece is galvanized steel or bare steel, and the aluminum-based workpiece comprises an aluminum magnesium alloy, an aluminum-silicon alloy, an aluminum magnesium-silicon alloy, or an aluminum zinc alloy.

11. The method set forth in claim 1, wherein, prior to re-melting at least part of the weld bond area during the third period of time, the weld bond area is at least $4(\pi)(t)$, where t is the respective thickness of the aluminum-based workpiece at the weld site in millimeters.

12. A multi-stage spot welding method comprising:
pressing a pair of spot welding electrodes against a workpiece stack-up such that the spot welding electrodes are pressed against opposed sides of the workpiece stack-up, the workpiece stack-up comprising an aluminum-based workpiece and a steel workpiece that overlap to establish a faying interface;
passing electrical current through the aluminum-based workpiece and the steel workpiece and across the faying interface to grow a molten weld pool in the aluminum-based workpiece that extends from the faying interface of the steel workpiece and the aluminum-based workpiece into the aluminum-based workpiece for a first period of time, wherein the first period of time is adjusted based on at least respective thicknesses at a weld site and compositions of the aluminum-based workpiece and the steel workpiece to create the molten weld pool;
allowing the molten weld pool to solidify into a weld nugget that includes a weld bond area joined to a faying surface of the steel workpiece at the faying interface for a second period of time, wherein the second period of time is adjusted based on at least the respective thicknesses at the weld site and the compositions of the aluminum-based workpiece and the steel workpiece to establish the weld bond area;
passing electrical current through the aluminum-based workpiece and the steel workpiece and across the faying interface to re-melt at least a portion of the weld nugget that includes at least part of the weld bond area for a third period of time, wherein the third period of time is adjusted based on at least the respective thicknesses at the weld site and the compositions of the aluminum-based workpiece and the steel workpiece to re-melt the at least part of the weld bond area; and
allowing the re-melted portion of the weld nugget to solidify into a re solidified portion of the weld nugget.

13. The method set forth in claim 12, further comprising:
expelling at least part of the re-melted portion of the weld nugget at the faying interface before allowing the re-melted portion of the weld nugget to solidify.

14. The method set forth in claim 12, wherein, prior to passing electrical current to re-melt at least a portion of the weld nugget, the weld bond area of the weld nugget is at least $4(\pi)(t)$, where the respective is a thickness of the aluminum-based workpiece at the weld site in millimeters.

15. The method set forth in claim 12, wherein the weld nugget extends into the aluminum-based workpiece to a penetration depth, and wherein the re melted portion of the weld nugget does not extend to the penetration depth of the weld nugget.

16. The method set forth in claim 12, wherein the weld nugget includes a weld bond area joined to a faying surface of the steel workpiece at the faying interface, and wherein the re-melted portion of the weld nugget includes up to 100% of the weld bond area of the weld nugget.

17. The method set forth in claim 12, wherein the re-melted portion of the weld nugget includes the entire weld bond area of the weld nugget and further combines with molten material of the aluminum-based workpiece outside of the weld bond area of the weld nugget so that, upon cooling and solidification, an enlarged weld bond area is established.

* * * * *